3,499,787
METHOD OF MANUFACTURING LOW
THERMAL-EXPANSION PORCELAIN
Motoyuki Inoue, Nagoya-shi, Aichi-ken, Japan, assignor to Nippon Joki Kabushiki Kaisha, Nagoya-shi, Aichi-ken, Japan, a corporation of Japan
No Drawing. Filed Oct. 20, 1965, Ser. No. 499,022
Claims priority, application Japan, Aug. 12, 1965, 40/48,699
Int. Cl. C03c 17/22; C04b 33/24
U.S. Cl. 117—118                    1 Claim

ABSTRACT OF THE DISCLOSURE

A process for manufacturing low thermal-expansion porcelain comprising a low-expansion porcelain body and a low thermal-expansion glaze layer on said body which is dense, smooth and hard, which comprises coating a cordierite body containing $Li_2O$ or a $Li_2O$-containing mineral as an additive with a glaze forming material containing $SiO_2$ as the principle component and then firing the coated body at a temperature of about 1250–1350° C.

---

This invention relates to a method of manufacturing heat-resisting porcelain, and more specifically to a method of forming a smooth, dense, hard and crack-free glaze layer on the surface of a low thermal-expansion porcelain body having a thermal expansion coefficient in the range of $3.9 \times 10^{-6}$–0.

It has been deemed very difficult to coat the surface of a low thermal-expansion porcelain body with a glaze having a still lower thermal-expansion coefficient than that of the porcelain body. For such glazing purpose, various attempts have been made including coating with very thin glassy layers, self-glazing and cracked glazing, but none has proved satisfactory.

The formation of thin glassy films involves difficulties in ensuring uniform thickness, and tends to cause crack in thick portions of the film. Self-glazing is quite susceptible to variations in heating or cooling conditions and the glazing process makes it difficult and unpracticable to obtain products of stable qualities. Cracked glazing also has following disadvantages: Tensile stress caused by the greater thermal-expansion coefficient of the glaze than that of the body is exerted on the surface of the porcelain body to lower the thermal resistibility and to cause cracks, into which impurities tend to fill, bringing up problems on sanitation and appearance.

An object of this invention is to provide a low thermal-expansion porcelain which consists of a low thermal-expansion porcelain body and a low thermal-expansion glaze layer on said body.

Another object of this invention is to provide a low thermal-expansion porcelain which has a smooth, dense, hard, and crack-free glaze layer.

A further object of this invention is to provide a new manufacturing method of a low thermal-expansion porcelain which possesses aforesaid characteristics.

These objects of this invention are accomplished by coating the green or biscuit body surface of the porcelain with a preparation which will react with the main constituents or additives of the body to form crystals of low thermal-expansion coefficient in the glaze, and by firing the coated body to vitrify and also to form a glaze layer which contains a large amount of low thermal-expansion crystals on the surface of said body, thereby obtaining a smooth, dense, and hard porcelain which will not absorb water and has good thermal resistibility.

The low thermal expansion crystals deposited in the glaze layer are, according to the method of this invention, silica O solid solution crystals whose end-members are composed of high-quartz and eucryptite or β-spodumene solid solution crystals and the like.

$Li_2O$ or a mineral containing $Li_2O$ is added to the porcelain body and also a glaze composed essentially of $SiO_2$ is also used, in order to deposit silica O in the glaze when the body is of cordierite type.

This invention is applicable to cordierite.

(I) Cordierite body:

(1) Talc (green or calcined), 35–46% (wt.); clay, 20–47%; and alumina, 15–25%.
(2) Magnesite, 5–17%; talc (green or calcined), 14–25%; and clay, 67–75%.
(3) Mg-chlorite, 40–50%; clay, 50–60%; and talc, 0–10%.
(4) Talc (green or calcined), 14–50%; and clay, 41–75%.

These (1)–(4) preparations on cordierite body have been generally known and as additives for the promotion of vitrification, feldspar, nepheline, metallic oxides, carbonates, or silicates such as $ZnO$, $BaCO_3$, $PbSiO_3$, or $ZrSiO_4$ have also been known.

According to this invention, the cordierite porcelain body is first prepared so as to contain the following substances in the amount of 0.12 to 1.0% by weight in term of $Li_2O$, such as petalite, spodumene, eucryptite or other lithium containing minerals which will diffuse and leach out of the body and will react with the glaze to deposit low thermal-expansion crystal in the glaze and then the preparation is formed by jiggering or by casting. Then, the glaze consisting of $SiO_2$, 75–80% (molar); $Al_2O_3$, 8–11%; $MgO$, 0–7%; $CaO$, 1–5%; $K_2O$, 0–2%; $Na_2O$, 0–1%; and $Li_2O$, 0–8% is applied on the body. Then, the coated body is fired at 1250–1350° C. By this treatment, crystals of low thermal-expansion coefficient composed principally of silico O solid solution whose end-members are formed of high-quartz and β-eucryptite are deposited in the glaze. The porcelain can be provided with a desired thermal-expansion coefficient over the broad range of $3.9 \times 10^{-6}$–0 by changing the composition within the ranges above specified. Moreover, the porcelain can have a smooth, dense, hard, and semi-mat-like low thermal-expansion glaze layer on the body, irrespective of the cooling conditions, and no such subsequent treatment as re-heating is needed as in the case of conventional glass-ceramics, e.g. Pyroceram.

The compressive stress of the glaze layer having a lower thermal-expansion coefficient than the porcelain body, the layer being produced by the reaction of the glaze-forming material with the green or biscuit porcelain body during firing, increases the strength of the end product.

If the lithium-containing mineral added to the porcelain body is not more than 0.12% in terms of $Li_2O$, crystals will not be deposited in the glaze. If the content of $Li_2O$ exceeds 1.0%, cracks will develop in the porcelain body with a corresponding drop in the physical strength.

In this case $ZnO$ not only promotes vitrification but also enhances whiteness of the porcelain body.

A low thermal-expansion porcelain thus obtained has a smooth, dense, and hard glazed surface, and will not absorb water. Therefore it has a good appearance as well as durability which makes this porcelain suitable and useful for tableware and industrial applications. Furthermore, it will possess thermal resistibility and physical strength, not causing a crack on sudden heating or quenching because of the great compressive stress in the glaze.

This invention is illustrated by the following example.

EXAMPLE

A cordierite composition consisting of:

| | Weight percent |
|---|---|
| Talc (calcined) | 40 |
| Alumina | 18 |
| Plastic clay | 25 |
| Petalite | 7 |
| Alkaline feldspar | 7 |
| Zinc white | 3 | is finely ground and mixed by ball mill. From the mixture in slurry, ferrous contents and excess water are removed. The mixture is then formed to porcelain body by jiggering or by casting.

Next, a green glaze composition consisting of:

| | Weight percent |
|---|---|
| Silica sand | 43 |
| Alkaline feldspar | 10 |
| Petalite | 30 |
| Alumina | 7 |
| Talc | 5 |
| Dolomite | 5 | is finely ground and mixed by ball mill, and applied on the surface of the above green or biscuit body. The coated body is then fired at 1250–1300° C.

The characteristics of the product thus obtained are as follows:

| | |
|---|---|
| Bending strength | 1000 kg./cm.$^2$. |
| Linear thermal-expansion coefficient (porcelain body) | $2.8 \times 10^{-6}$. |
| Linear thermal-expansion coefficient (glaze) | $2.4 \times 10^{-6}$. |
| Thermal shock resistance (quenching temp. difference) | 300° C. |
| Water absorption | None. |
| Color | Pure white. |
| Surface condition | Semi-mat, dense, and hard. |

I claim:
1. A process for manufacturing low thermal-expansion porcelain comprising a low thermal-expansion porcelain body and a low thermal-expansion glaze layer on said body which is dense, smooth and hard, which comprises coating a cordierite body having a composition selected from the group consisting of:
   (1) 35–46% by weight of talc, 20–47% by weight of clay and 15–25% by weight of alumina,
   (2) 5–17% by weight of magnesite, 14–25% by weight of talc and 67–75% by weight of clay,
   (3) 40–50% by weight of Mg-chlorite, 50–60% by weight of clay and 0–10% by weight of talc, and
   (4) 14–50% by weight of talc and 41–75% by weight of clay, the porcelain body having incorporated therein $Li_2O$ or $Li_2O$-containing mineral in an amount of 0.12–1.0% by weight calculated as $Li_2O$, with a glaze-forming material comprising 75–80 mol percent of $SiO_2$, 8–11 mol percent of $Al_2O_3$, 0–7 mol percent of MgO, 1–5 mol percent of CaO, 0–2 mol percent of $K_2O$, 0–1 mol percent of $Na_2O$ and 0–8 mol percent of $Li_2O$, and then firing said coated body at a temperature of about 1250–1350° C.

References Cited

UNITED STATES PATENTS

| | | | |
|---|---|---|---|
| 2,919,995 | 1/1960 | Landron | 106—65 XR |
| 3,268,315 | 8/1966 | Stookey | 65—62 XR |
| 3,275,493 | 9/1966 | MacDowell. | |

FOREIGN PATENTS 239,249   7/1962   Australia.

ALFRED L. LEAVITT, Primary Examiner

W. F. CYRON, Assistant Examiner

U.S. Cl. X.R.

65—33, 62; 106—39; 117—125